H. D. COLMAN.
WARP TYING MACHINE.
APPLICATION FILED OCT. 5, 1906.

1,079,470.

Patented Nov. 25, 1913.

H. D. COLMAN.
WARP TYING MACHINE.
APPLICATION FILED OCT. 5, 1906.

1,079,470.

Patented Nov. 25, 1913.

Witnesses
C. Paul Parker
George L. Chindahl

Inventor
Howard D. Colman
By Luther L. Miller
Atty

H. D. COLMAN.
WARP TYING MACHINE.
APPLICATION FILED OCT. 5, 1906.

1,079,470.

Patented Nov. 25, 1913.

UNITED STATES PATENT OFFICE.

HOWARD D. COLMAN, OF ROCKFORD, ILLINOIS, ASSIGNOR, BY MESNE ASSIGNMENTS, TO HOWARD D. COLMAN, LUTHER L. MILLER, AND HARRY A. SEVERSON, COPARTNERS DOING BUSINESS AT ROCKFORD, ILLINOIS, AS BARBER-COLMAN COMPANY.

WARP-TYING MACHINE.

1,079,470.  Specification of Letters Patent.  Patented Nov. 25, 1913.

Application filed October 5, 1906. Serial No. 337,651.

*To all whom it may concern:*

Be it known that I, HOWARD D. COLMAN, a citizen of the United States, residing at Rockford, in the county of Winnebago and State of Illinois, have invented certain new and useful Improvements in Warp-Tying Machines, of which the following is a specification.

This invention relates to machines for automatically tying in warps and refers particularly to improvements upon the warp-tying machine shown and described in my co-pending application Serial No. 208,779, filed May 19, 1904.
One of the objects of the present invention is to provide a pull-back apparatus for the main carriage, which pull-back apparatus includes an automatic throw-out mechanism for the feed pinions.
The invention also refers to a cam for oscillating the selectors.

The invention further refers to a throw-out mechanism for withdrawing the stumblers from their normal positions.
The invention also refers to a yielding, automatically-adjusting shear for severing the threads.

The invention also refers to an improved locking means for the warp clamps.
The invention further refers to a yielding pivoted rack-end for the carriage feed.

The invention further refers to an adjusting clamp device for the air tube.

The invention further refers to an improved form of tension-adjusting device for the selectors.

The invention further refers to an improved means for securing the fork rod to the main slide.
The invention also refers to an improved means for actuating the mechanism by hand.

The invention also refers to an improved means for clamping the threads just prior to the shearing operation.

The invention also refers to the various other and further improvements in the details of construction of said warp-tying machine and in the simplification of its various parts.

In the present embodiment of this invention the warp-tying mechanism proper is mounted upon a carriage hereinafter called the main carriage, and said main carriage is mounted upon a bed along which it is adapted to be advanced by suitable feeding means. The bed is supported at a suitable distance above the floor by means of suitable legs, and beams containing new warps, together with short lengths of old warps with harnesses and reeds thereon, are presented to said warp-tying machine by the operator, preferably by means of suitable mechanism, one form of which is illustrated in my co-pending applications Nos. 305,587 and 305,538, filed March 12, 1906. The end of the new warp is immovably supported above the bed upon which the main carriage travels, while the old warp is held in a warp carriage adapted to have a feeding movement with relation to the main carriage. Both warps are placed with their threads at substantially a right angle with the length of the bed and the direction of travel of the main carriage. When the warps are clamped in position to be operated upon by the warp-tying mechanism, they lie quite near together in two parallel horizontal planes, the threads of the respective warps lying parallel to each other and extending transversely to the line of travel of the main carriage.

The mechanism mounted upon the main carriage comprises means for selecting pairs of threads, each pair consisting of a thread from each warp; for separating the selected threads from the remaining warp threads; for shearing the ends of said threads to provide slack therein; for presenting said threads to the thread-uniting mechanism; for uniting said threads; for trimming the ends of the knot; and for drawing the united ends from the mechanism as the main carriage advances. The main carriage is fed across the planes of the warps by means of a sensitively controlled feed, which feed is made inoperative when the threads of the new warp are in a proper position to be taken by the selector for said warp. The warp carriage is fed with relation to the main carriage by a sensitively-controlled feed mechanism similar to that for advancing the main carriage, which warp-carriage feed is rendered inoperative when a thread of the old warp is in position to be taken by the selector for said warp.

Should the selector mechanism fail to grasp a thread from each of the warps, a try-again mechanism permits a repetition of the operation of the selector mechanism for a predetermined number of times. Should a warp thread be selected from each warp before the predetermined number of trials is exhausted, the regular operation of the mechanism will be resumed, but should all the trials be fruitless and no warp thread or a thread from only one warp be taken, the try-again mechanism operates a stop device for the machine.

By means of a fan and a suction tube the waste ends trimmed off the knots are removed, and in order to save blowing these ends into the room, a centrifugal collector is provided within which said thread-ends are gathered and retained.

The two warps are held in the machine by means of two pairs of clamps, one clamp of each pair being movable slightly toward and away from the other clamp to place tension upon the threads. In placing the warps in the clamps the threads are laid over the narrow raised edge of a metallic ribbon placed between the two clamps of each pair, the thread-engaging edge of which ribbon is finely serrated or roughened, and after the threads have been secured in said clamps and placed under tension, said ribbons are moved longitudinally a slight distance in the direction of movement of the main carriage in order to slightly deflect said threads between their clamped ends, bowing each thread away from said main carriage. This bowing enables the threads to offer greater resistance to the pressure of the thread-selectors and the feed-controlling levers. When the selector mechanism engages the two forward threads of the warps, and pushes said threads toward each other, said selected threads are lifted from their frictional engagement with said roughened ribbons, whereupon they spring into a straight line and in so doing separate themselves from the other threads of their warps.

Figure 1:
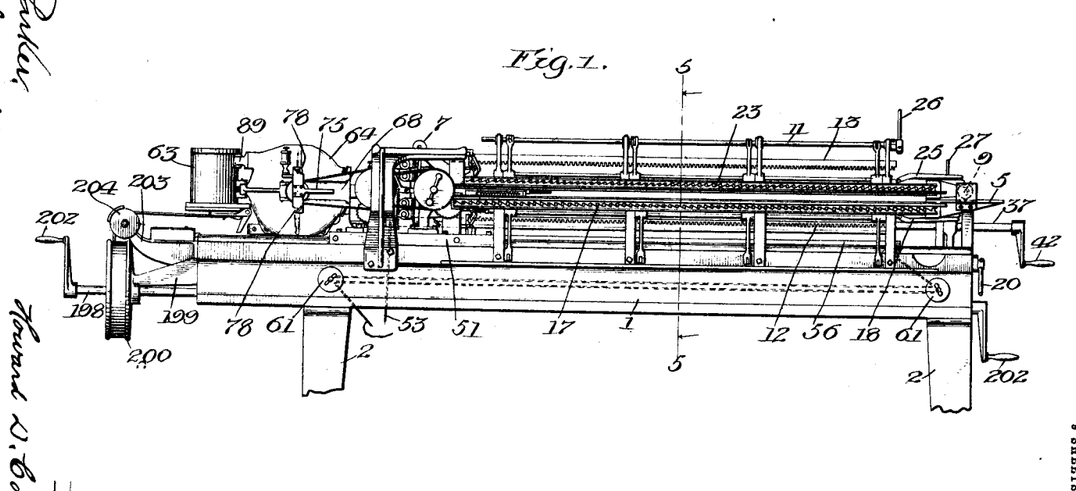
Fig. 1 is a front elevation of a warp-tying machine embodying the features of my invention.

To secure greater clearness in the description of the present embodiment of this invention I shall designate the left-hand end of the machine as illustrated in Figure 1, the head or head end. The right-hand end in said figure will be known as the foot of the machine. The side shown in said figure will be called the front side; the opposite side will be designated as the rear side. The main carriage is fed from the head toward the foot of the machine. The advancing end of said carriage will be called its front or forward end. The suction tube opens toward the front end of the carriage. The slide that carries the thread-separating devices is mounted upon the main carriage and is adapted to be reciprocated longitudinally of the machine. As the parts supported by the separator slide are operative in their movement from the foot toward the head of the machine, I will designate the end of the slide nearest the head of the machine as the front or forward end, and will refer to the operative movement of said slide and its parts as their forward movement. The selectors have a reciprocatory movement toward and away from a line drawn midway between the planes of the two warps and therefore they will be said to move inwardly and outwardly. The points of the selectors, therefore, will be their inner ends. The warp from the loom I have called the old warp or the loom warp, and the warp carried by the beam has been designated as the new warp. The old or loom warp is clamped in the warp carriage,—the new warp in the clamps upon the bed. When the tying-in process is completed and the ends of the new warp have been tied to those of the old warp the new warp upon its beam is placed in the loom.

In the accompanying drawings.

The embodiment herein shown of my invention comprises a bed 1 carried upon supporting legs 2. Upon said bed are rigidly mounted rails 3, 4, 5 and 6 for receiving the supporting rollers 7, 8, 9 and 10 of the warp carriage 11 (Figs. 1, 5, 26 and 28). A rack bar 12 is mounted upon the bed 1 and a rack bar 13 is secured within the warp carriage 11. The end of the rack bar 12 near the head end of the machine comprises a pivoted portion 14 (Fig. 33) normally held in alinement with the remainder of the rack by means of a coiled spring 15. When the operator pushes the main carriage forward to bring the feeding pinion of said carriage into engagement with said rack, the pivoted portion 14 will yield, if necessary, to permit said pinion to mesh with said rack.

As in my co-pending application No. 208,779, the new warp is clamped within the fixed clamp 16 and the pivoted clamp 17 upon the bed 1 by operating the levers 18. (Figs. 1, 5, 26 and 28.) Intermediate said clamps the threads extend over a serrated metallic ribbon 19. The clamp 17 is rocked by means of the lever 20 to place tension upon the threads, and the ribbon 19 is moved longitudinally by means of the lever 21 to deflect the threads from a straight line. The warp carriage 11 is provided with similar warp clamps 22 and 23 and a serrated ribbon 24, the warp being secured in said clamps by operating the levers 25, stretched taut by means of the lever 26 and deflected from a straight line by operating the lever 27.

Figures 26, 28, 29, 32:
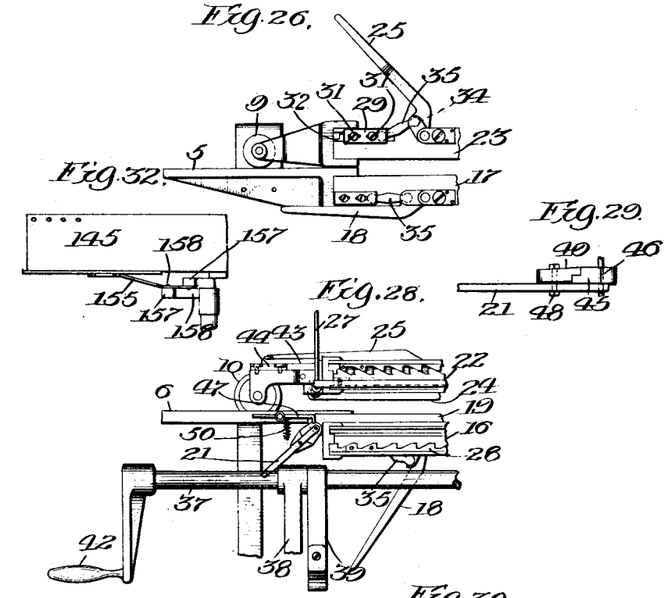
Fig. 26 is a detail view showing an improved means for operating the warp clamps.
Fig. 28 is a view showing the means for mechanically withdrawing the insertion bar at the rear side of the warp carriage. This view also shows means for adjustably locking the levers that operate the warp-deflecting ribbons.
Fig. 29 is a detail view of said locking means.
Fig. 32 is a top plan view of said thread clamp.
Figures 27, 30, 31, 33:
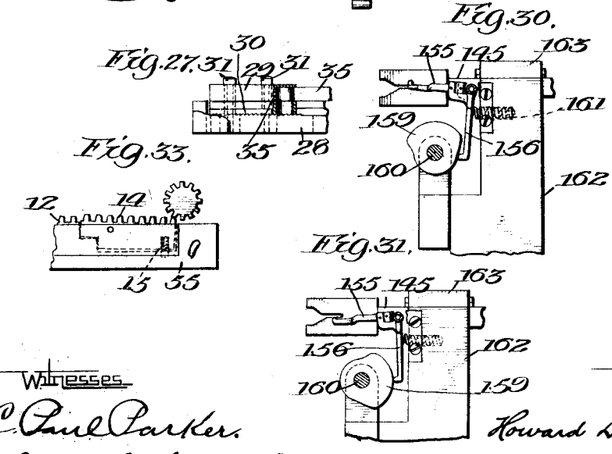
Fig. 27 is a detail illustrating a means for adjusting the degree of pressure exerted by the warp clamps.
Fig. 30 is a side view of the thread clamp for holding the threads at the side of the air tube after they have been severed by the shears. In this view the clamp is in its closed position.
Fig. 31 is a similar view showing the thread clamp in its open position.
Fig. 33 illustrates the pivoted end of the feed rack for the main carriage.

For clamping the warps I employ in the present construction a clamp similar to that illustrated in my prior application, save that the connections of the operating lever are somewhat improved. Said improved construction is shown in Figs. 26, 27 and 28 of the drawings. The rear side of one end of the longitudinally-movable clamping member 28 of each of the warp clamps 16, 17, 22 and 23 is serrated. A block 29 having a serrated face 30 is adjustably secured to the serrated end of the clamping member 28 by means of screws 31 passing through elongated openings 32 in said block into said clamping member. In one end of said block is formed a socket 33 and in the clamping lever (18 25) is formed a similar socket 34, which sockets are adapted to receive cylindrical heads formed upon the ends of a link 35. The outer (exposed) ends of the sockets 33 and 34 are closed so that the link 35 is held securely in said sockets save when the lever (18 25) and the block 29 are removed from their supports. It will be seen that moving the lever 18 into the position shown in Fig. 26 will move the clamping member 28 longitudinally and clamp the warp threads within the clamp 17. The degree of pressure exerted upon the warp threads by the clamp is regulated by adjusting the position of the block 29 with relation to the clamping member 28.

As in the earlier embodiment hereinbefore referred to, the warp threads are inserted into each of the clamps 16, 17, 22, and 23 by means of an insertion bar 36. In the machine shown in the drawings of this application, means is provided for mechanically withdrawing the insertion bar 36 at the rear side of the warp carriage 11. Said means comprises a shaft 37 (Figs. 5 and 28) rotatably mounted in suitable bearings 38 and extending lengthwise of the machine at the rear side thereof. Said shaft carries near its ends two fixed arms 39 each having at its outer end an opening 40 adapted to receive the insertion bar 36 at the rear side of the warp carriage 11. A curved leaf spring 41 within said opening frictionally engages the insertion bar to retain it in said opening. Upon one end of the shaft 37 is fixed a hand crank 42 for oscillating it. When it is desired to remove the insertion bar at the rear side of the warp carriage, the shaft 37 is rotated to swing the arms 39 upwardly into engagement with the insertion bar. The shaft is then turned to swing said arms downwardly, said arms taking with them the insertion bar 36.

Fig. 28 illustrates means for limiting the longitudinal movement of the ribbons 19 and 24, and, therefore, for governing the amount of bowed or side deflection given to the threads of the two warps. As in my earlier embodiment, this bowing is imparted by the crank levers 21 and 27, the former for the new warp, and the latter for the old warp. The lever 27 is locked from rearward movement by means of the pivotal stop arm 43, which stop arm is adapted to be moved into line with said lever and thus form a stop against its rearward movement. The stop arm 43 is mounted upon a block 44 adjustably secured to the warp carriage 11 by means of a slot and screw connection. The lever 21 for the lower ribbon 19 has an adjustable sector 45 having a locking shoulder 46 with which a pawl 47 is adapted to engage. The sector 45 is loosely mounted upon the pivotal bearing of the lever 21, and may be locked in any position with relation to said lever by means of the clamping screw 48, which screw coöperates with a clamping block 49 to frictionally hold the sector 45 between said lever and said clamping bar. In practice, the lever 21 is pivotally moved, sliding its ribbon 19 until the pawl 47 drops behind the shoulder 46 of the sector 45. The pawl 47 is held in engagement with said shoulder by means of the coiled extension spring 50.

Figure 3:
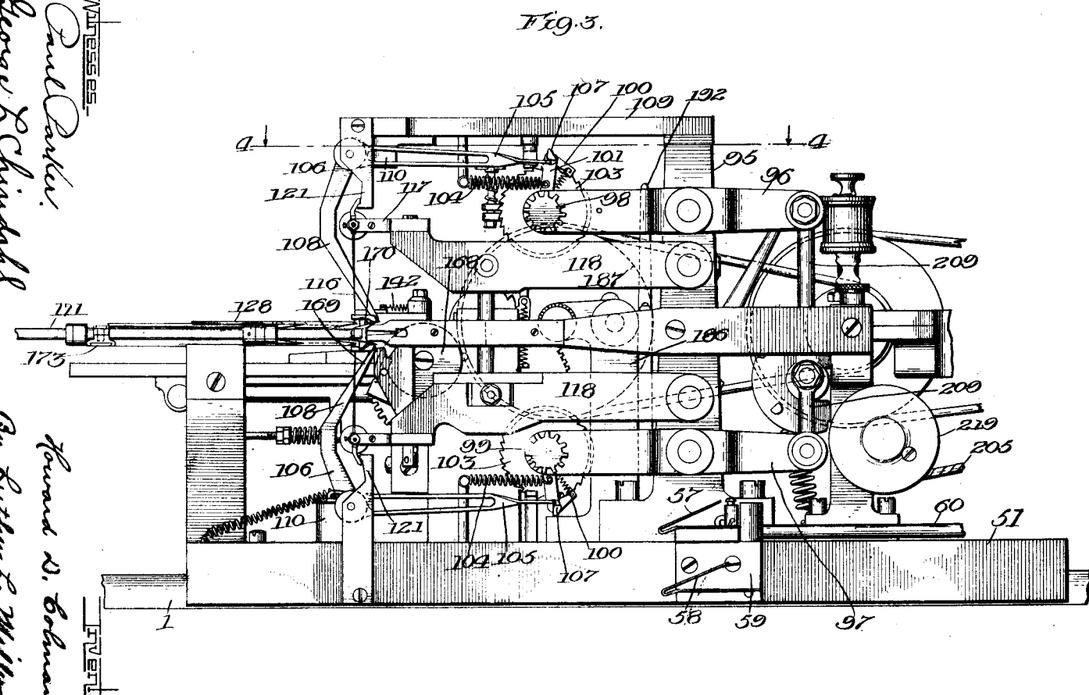
Fig. 3 is an enlarged side elevation of the main carriage, taken from the rear side of the machine.

The warp-tying mechanism proper is supported upon a main carriage 51 slidably mounted upon the bed 1. Said mechanism is driven, the main carriage sensitively fed along the bed 1, and the warp carriage 11 given a feeding movement with relation to the main carriage, by means of a motor 52 upon the main carriage 51. The electric current to operate the motor is conducted to the machine by means of wires 53 (Fig. 1) entering beneath the bed 1. One of these wires terminates in a contact strip 54 (Fig. 5) of copper or other suitable material let into an insulating bar 55 of fiber secured upon the lower edge of the rack bar 12, and the other wire is connected with a contact bar 56 of suitable conducting metal supported upon but insulated from the bed 1. Contact springs 57 and 58 (Figs. 3 and 4) mounted upon a bracket 59 of insulating material upon the main carriage 51 are in position to contact the strip 54 and the bar 56, respectively. The wires (not shown) from said springs pass through the tube 60 to the fields of the motor. Two three-way switches 61 (Fig. 1) near the ends of the bed 1 provide means for turning off the current at any time.

As in the embodiment shown in my prior application, a fan 62 (Fig. 6) is employed for creating an air current for holding the threads during certain stages of the operation of tying the threads and for removing the waste ends cut off by the knotter mechanism, said waste ends being discharged into a centrifugal collector 63. In order to provide a ready access to all of the air passages, the casing for the fan 62 is "split" longitudinally in a vertical plane, the forward portion 64 (Figs. 6, 7 and 8) being hinged to the rear portion 65 at 66, said front portion, therefore, forming, in substance, a closure for the casing. An air flue 67 formed in said closure 64 is also split longitudinally in a vertical plane, the forward side 68 being hinged at 69 to the closure 64. The hinge 69 is a simple pintle hinge, but the hinge 66 is slightly more complex. In the last mentioned hinge, the pintle is made loose, the closure 64 being held tightly against its seat upon the rear portion 65 by a coiled spring 70 bearing at its ends against ears 71 extending rearwardly from the casing-sections 64 and 65. By this arrangement the closure 64 will not be sprung out of shape, should it be forced shut upon intruding matter, as lint, etc., and will close tightly, when its seat is free from dirt, without the necessity of employing packing. The closure 64 is held firmly seated by means of winged nuts 72 turned on bolts 73 pivoted in the rear portion 65 of the fan casing, said bolts being adapted to enter notches 74 in the upper and the lower edges of said closure. The flue-closure 68 is held shut by a flat spring 75 secured to, and extending forwardly from, the forward bearing for the motor shaft.

Figure 6:
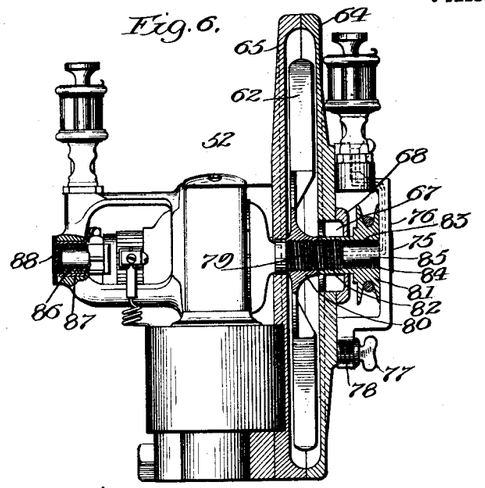
Fig. 6 is a transverse vertical central section taken through the fan and its casing. This view illustrates the bearings for the motor shaft.
Figures 7, 8:
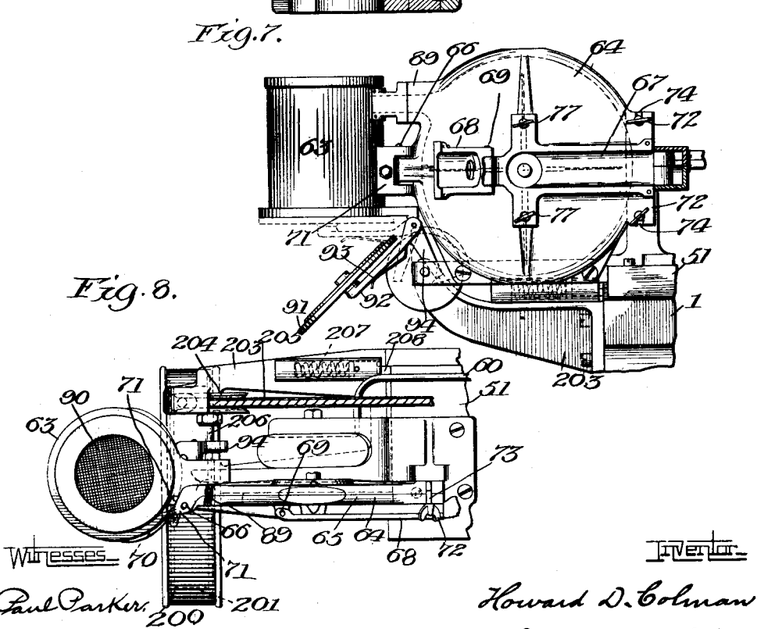
Fig. 7 is a side elevation of the fan casing, the hinged outer portion of the air tube and the hinged bottom of the waste-thread collector both being shown in their open positions. In this view the forward bearing for the motor shaft is removed.
Fig. 8 is a top plan view of the fan casing and the waste-thread collector.
Figure 9:
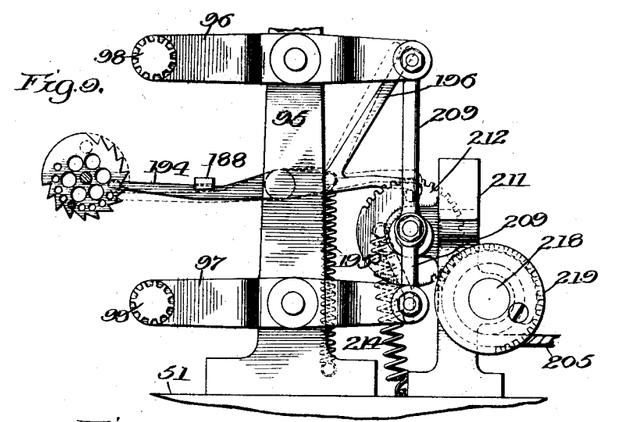
Fig. 9 is a detail view of the throw-out mechanism in the position it occupies during the operation of the machine.
Figure 10:
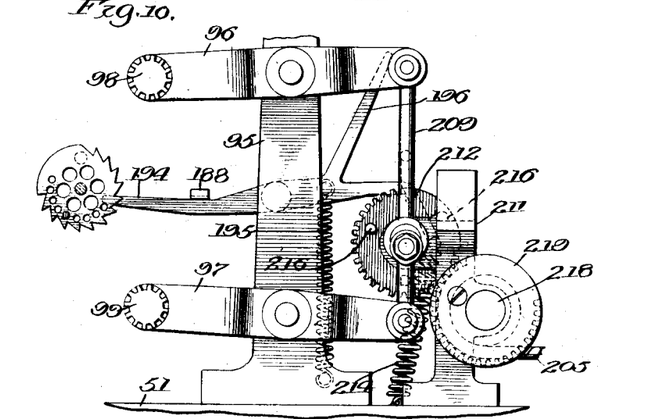
Fig. 10 is a similar view showing the throw-out mechanism "thrown out" ready for the withdrawal of the main carriage.

It will be seen that to open the fan casing as has just been described, it is necessary to remove the forward bearing of the motor shaft. This bearing comprises the bearing bracket 76 secured to the front side of the closure 64 by means of screws 77, said bracket having notches 78 in its opposite sides to receive said screws. (It is upon the outer face of this bracket that the spring 75 for the closure 68 is secured). The motor shaft 79 within the fan casing is screw-threaded, and the fan hub 80 is correspondingly threaded, adapting it to be turned upon said shaft. The grooved pulley 81 has an inwardly extending hub 82 which likewise is screw-threaded, the body portion of said pulley being bored out slightly larger than said hub, forming a cylindrical central socket 83. The screw-threads of the hub 82 correspond with those of the motor shaft 79. The cylindrical central socket 83 is adapted to receive two perforated sleeves 84, one lying within the other. The bearing at the forward end of the motor shaft 79 is formed by means of a cylindrical stud 85 fixed to and projecting inwardly from the bracket 76. The sleeves 84 have a somewhat loose fit upon one another and upon said bearing stud 85, their purpose being to permit the rapidly-rotating motor shaft to center itself, also to insure the perfect lubrication of the moving parts. The bearing at the rear end of the motor shaft comprises two sleeves 86 similar to the sleeves 84, running in a hard bushing 87 fixed within the motor frame. The outer end of the last mentioned bearing is closed by a plug cap 88, the plug of which is adapted to enter the bushing 87 a short distance to hold the plug cap in place. This plug also answers as a thrust bearing to hold the motor shaft in its proper longitudinal position.

The centrifugal waste-thread collector 63 is rigidly supported at the rear side of the fan casing and communicates with said casing by means of the air flue 89. The open upper end of the collector is provided with a wire screen 90 and the lower end with a closure 91 loosely mounted upon a pivoted arm 92, which arm is held upward to seat the closure by means of a spring 93. The arm 92 has a projecting finger 94 extending into position to be engaged by a trip finger to be hereinafter described.

Figure 2:
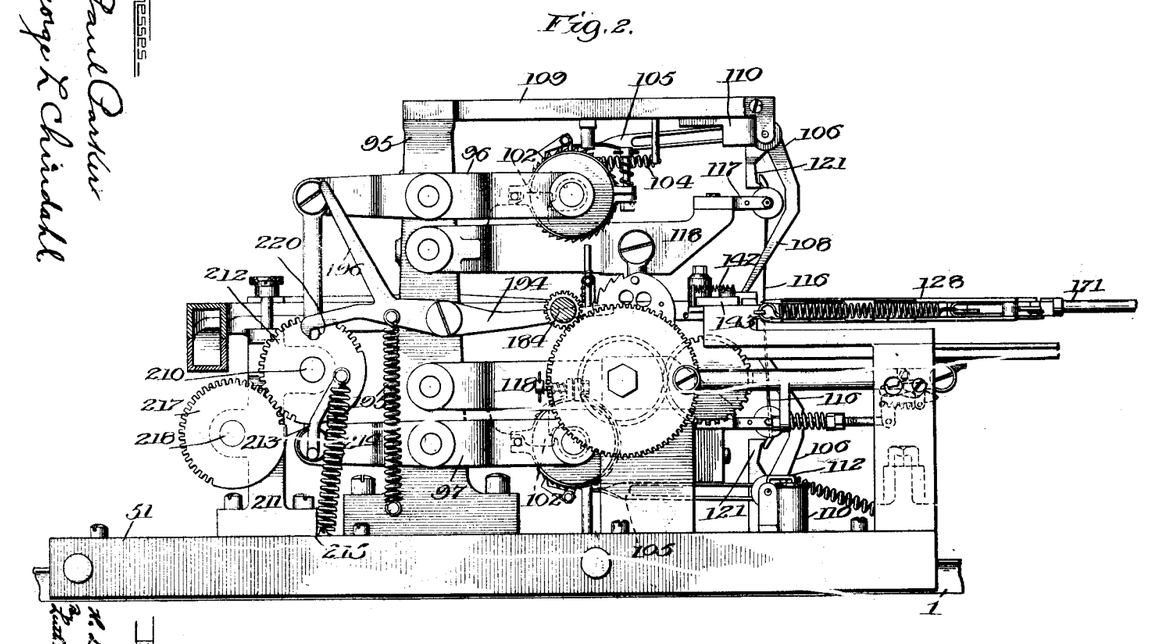
Fig. 2 is a similar view of the main carriage upon an enlarged scale, the sheaves for carrying the driving belts from the motor being removed for greater clearness. The motor, exhaust fan, and waste-thread collector supported by said carriage have been omitted from this figure.

Upon the standard 95 (Figs. 2, 3 and 4) of the main carriage 51 are pivotally mounted two levers 96 and 97, said levers carrying at their forward ends feed pinions 98 and 99, respectively, adapted to mesh with the racks 12 and 13. The pinions 98 and 99 are intermittently rotated according to the necessity of the work by means of feeding pawls 100 carried at the outer ends of bell-crank levers 101, one arm of each of said bell-crank levers lying at one side of the end of a projection 102 upon each of the oscillatory selector levers to be hereinafter described. When said selector levers move inwardly (that is to say, toward each other) the interengaging ends of the bell-crank levers 101 and projections 102 cause the feeding pawls 100 to move in the direction to engage one of the teeth of a ratchet wheel 103 fixed with relation to each of the feed pinions 98 and 99. A spring 104 tends to restore the bell-crank lever 101 to its initial position. Such restoring movement is partially prevented whenever warp threads are in position to be operated upon, by reason of the engagement of the rear end of the arm 105 of the feed levers 106 with a stud 107 upon said bell-crank lever 101. The inner end of the other arm 108 of said feed levers 106 is adapted to lie against the foremost thread of its warp.

Figure 18:
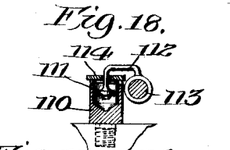
Figs. 18 and 19 illustrate the lower and upper dash-pots, respectively.
Figure 19:
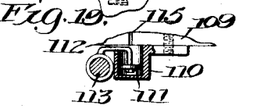

To prevent trembling or excessive vibration of the feed-controlling levers 106 tending to interfere with the proper action of the feed, I provide a dashpot device arranged as follows: On the base of the main carriage 51 and on the under side of an arm 109 fixed to the standard 95 on said carriage, I provide a cup 110 (Figs. 18 and 19) in which is placed a quantity of a suitable oil. A plunger 111 fitting the cup 110 very loosely is fixed by means of an arm 112 to each of the shafts 113 upon which the feed levers 106 are mounted. The cup for the lower feed lever is closed by means of a removable cap 114. Oil is introduced into the cup for the upper feed lever through a filling opening 115 in the arm 109. As will be seen, the oscillation of the feed levers 106 will move the plungers 111 in the cups 110 and the viscosity of the oil in said cups will tend to retard the action of said feed levers.

The warp threads are freed from engagement with the serrated ribbons 19 and 24 and carried into position to be operated upon by succeeding mechanisms by means of selectors 116 (Figs. 2, 3, 22, 23, 24 and 25) pivotally supported in yokes 117 fixed to the forward ends of the selector levers 118. By said selector levers the selectors 116 are given a reciprocatory movement toward and away from each other across the planes of their warps. Each selector is set into a socket arm 119 fixed upon an oscillatory shaft 120 rotatably mounted in the yoke 117. By means of a cam block 121 fixed in the carriage frame and adapted to be engaged by an arm 122 extending from the socket arm 119, the point of the selector 116 is given any desired path of movement. In the present instance I endeavor to impart to the selector a nearly vertical movement to free the selected thread from its ribbon, then a rearward movement, and finally a substantially vertical movement.

Figure 25:
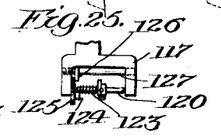
Fig. 25 illustrates the means for adjusting the spring tension of the selector.

A coiled spring 123 encircling the selector shaft 120 tends to move the selector toward the body of warp threads, one end of said spring entering an opening in the socket arm 119 and the other end of said spring being placed in an opening in a pin 124 set into the face of an adjusting disk 125 loosely mounted on the stud on which said selector shaft turns. The adjusting disk 125 is turned to place more or less tension upon the spring 123 as may be necessary in the operation of the machine, and is clamped in adjusted position against the adjacent yoke arm by means of a clamping blade 126, through an opening in which blade a clamping screw 127 extends, said screw entering a threaded opening in said yoke arm.

Figure 12:
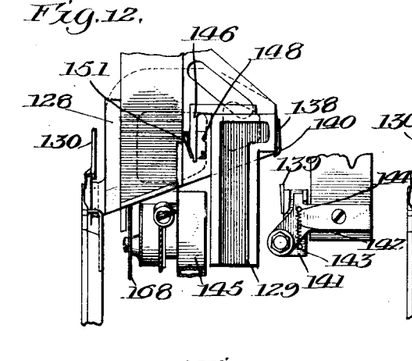
Fig. 12 is a top plan view of the knotter and the thread shear, the shear members being shown separated.
Figures 13, 17:
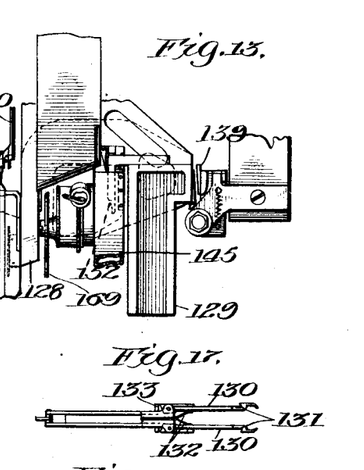
Fig. 13 is a view similar to that of the preceding figure, showing the shear members brought together.
Fig. 17 is a similar view showing the stumblers in their normal position, in which, if they or either of them be not moved out of the way by a thread, they engage the main slide and actuate the try-again mechanism.
Figures 14, 22:
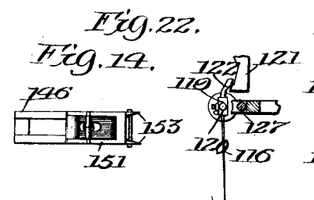
Figs. 14 and 15 are views taken from opposite sides of a device for clamping the threads just prior to the shearing operation and for pushing the severed ends into the air tube.
Figs. 22, 23, and 24 illustrate one of the selectors and the cam for oscillating it to withdraw the selected thread from the body of warp threads, the path followed by the point of the selector being indicated in dotted lines.
Figures 15, 23, 24:
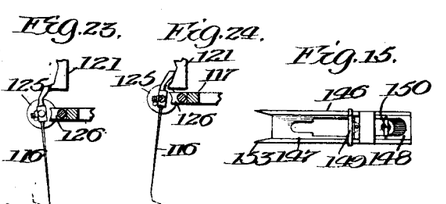
Figure 16:
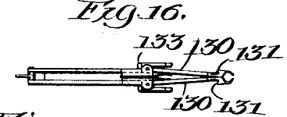
Fig. 16 is a side elevation of the stumblers in the position they occupy when the machine is to be operated for adjustment and inspection without warps.

As in the machine shown in my application hereinbefore referred to, the selected threads are separated from the body of warp threads by means of separator blades 128 fixed to a reciprocatory slide 129. (Figs. 3, 4, 12 and 13.) In Figs. 12 and 13 the upper separator blade is omitted. To stop the forward movement of the separator blades 128 when no thread or a thread from only one warp has been taken by the selectors 116, I provide for each of said separator blades a pivoted stumbler 130 (Figs. 16 and 17) having a hook 131 thereon adapted to engage the forward edge of said blade. Springs 132 between said stumblers normally hold them in position to engage the separator blades, from which position they are withdrawn when the selectors 116 carry threads into engagement with the forward portions of said stumblers and move them inwardly. The forward end of each stumbler 130 is forked (Figs. 12 and 13) and the selector reciprocates through the space between the fork arms. When the machine is to be operated empty (that is to say, without warps) it is necessary to withdraw the stumblers 130 from the path of the separator blades 128. This I accomplish by means of a slide 133, which, by means of a hand lever 134 (Fig. 4) may be moved to abut against the beveled rear ends of said stumblers (Fig. 16), and thus move the hooked forward ends of said stumblers inward out of the path of said blades. A pin 135 (Fig. 4) on the hand lever 134 is adapted to enter either one of two openings 136 in the locking stud 137 to lock said lever against movement.

The selected and separated threads are severed to provide loose ends for the tying operation by means of a shear blade 138 (Figs. 12 and 13) fixed to the separator slide 129 and coacting with a shear blade 139 carried by a stationary portion of the main carriage frame. To obviate the extreme accuracy of adjustment necessary in the use of a fixed shear, I have made the shear member 139 yielding, and have provided the shear member 138 with a guide portion 140 adapted to engage the yielding shear member 139 and move it into position to bring the two shearing edges into operative relation with each other. The yielding shear member 139 is carried upon a bracket 141 pivoted in the main carriage frame. A coiled spring 142 extending between a pin 143 on the bracket 141 and a pin 144 on the carriage frame holds the shear blade 139 normally forward in the path of the reciprocating shear member 138.

A moment before the threads are severed by the shear blades 138 and 139 said threads are clamped against the end of the suction air-tube 145 by means to be next described. Fixed with relation to the separator slide 129 is a bracket 146 having a guide-way 147 (Fig. 15) therein upon which is mounted a block 148 carrying at its forward end a clamping jaw 149 which is pivoted in order that it may clamp against the end of the air tube 145, with equal pressure, a new warp thread and an old warp thread of different sizes. The block 148 is frictionally held against movement in its guide-way 147 by means of a coiled spring 150 extending between said block and an arm 151 (Fig. 14) pivoted at one end to said block and at its other end bearing upon one face of the bracket 146. The forward portion of the bracket 146 is formed with a wedging surface 152 against which the free end of the arm 151 presses during the early part of the forward movement of the block 148. When the jaw 149 carries the threads against the abutment 145, the block 148 is stopped. The continuing movement of the separator blades and the wedging surface 152 forces the arm 151 outwardly, and thereby increases the tension on the spring 150. The resistance of the block 148 to movement in its guideway is thus increased, thereby placing an increased clamping pressure upon the threads at the moment of cutting them. The forward end of the bracket 146 is in the form of a fork 153. As the separator slide 129 moves forward, the selected and separated threads are clamped between the forward end of the suction air-tube 145 and the pivoted clamping jaw 149. A moment later said threads are severed by the shear, and the bracket 146 continuing in its forward movement the forked end 153 of said bracket carries the severed ends into the open end of the air tube, said ends slipping past the clamping jaw 149 as needed to permit of such movement. Upon the rearward movement of the separator slide 129 the block 148 is restored to its position near the forward end of the bracket 146 by means of a restoring pin 154 (Fig. 4) set in a stationary part of the main carriage frame.

While some of the tension upon the severed ends of the threads is created by the air current in the air tube 145, most of the tension upon said threads during the tying operation is caused by the spring clamping finger 155. (Figs. 30, 31 and 32). Said finger is removably held in position upon a pivotal arm 156 by means of two ears 157 upon said arm, said ears having pins 158 adapted to enter suitable openings in the rear end of said spring clamping finger. The finger 155 is held in place upon said pins by being sprung between opposite sides of said ears and the side of the air tube 145. The pivotal arm 156 at its lower end is bent to engage a cam 159 on the shaft 160 that actuates the knot-tying mechanism, said arm being held in contact with said cam by a compression spring 161 seated in an opening in the post 162.

Figure 4:
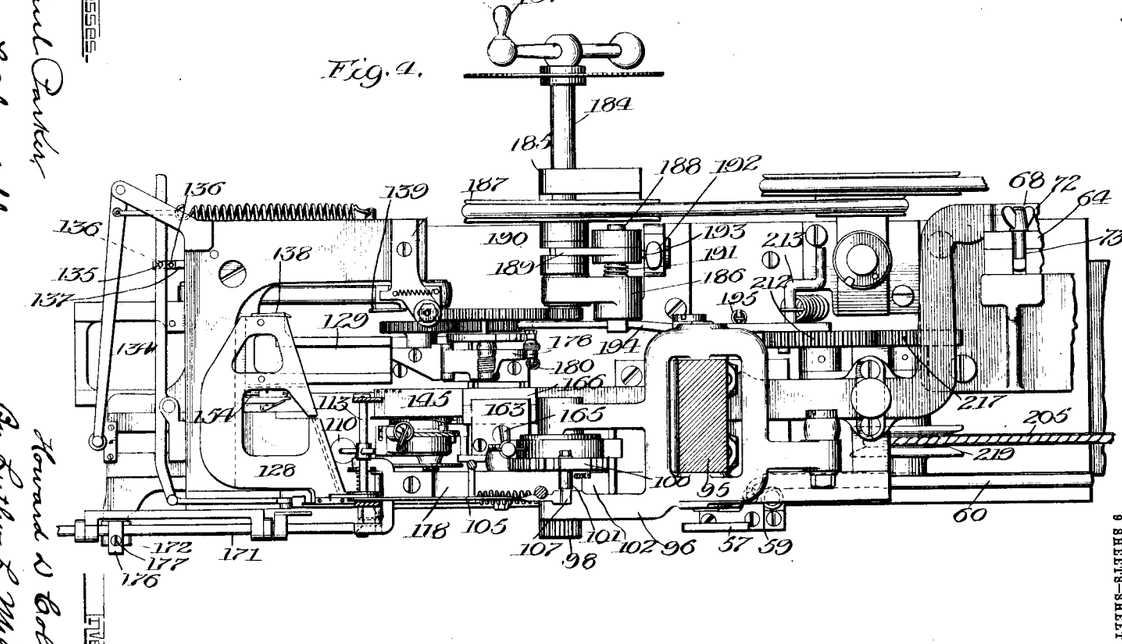
Fig. 4 is a top plan view of the main carriage, that portion of the frame above the section line 4 4 (Fig. 3) and the upper dashpot being removed.
Figure 5:
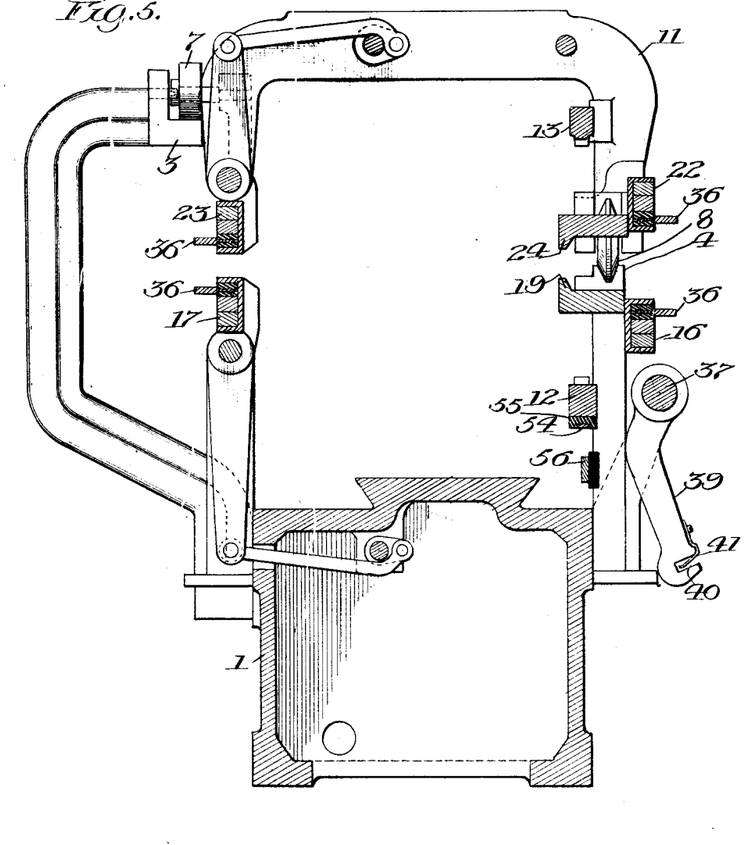
Fig. 5 is a transverse vertical section through the machine, the main carriage and the mechanism supported thereby being omitted.
Figures 20, 21:
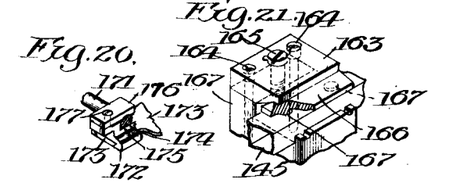
Fig. 20 shows a clamp for securing the stripper-fork rod to the main slide.
Fig. 21 illustrates an adjustable means for securing in place the forward end of the suction air-tube.

The air tube 145 is held in adjusted position by means of a clamp comprising a clamp block 163 secured to the post 162 by means of guide screws 164. (Figs. 4 and 21). A clamping screw 165 extending through said clamp block into the post 162 holds the clamp block 163 against the upper side of a chamfered piece 166 which chamfered piece has two guide pins 167 entering suitable openings in the upper wall of the air tube. To move the air tube for adjustment the clamping screw 165 is loosened and said tube slid endwise, as by tapping against one end of the chamfered piece 166.

The operation of the knotter is substantially the same as in my co-pending application, save that the knot is tightened and stripped from the tying-bill by a rotatory stripper disk 168 (Figs. 3, 12 and 13) having a hook 169 projecting from its periphery, said hook being adapted to engage said threads and pull them from the tying-bill. In the earlier machine shown in my said co-pending application an exhaust air tube was used to withdraw the united ends from the stripper arm of the knotter device, but in the present embodiment said air tube is dispensed with, the stripper fork 170 (Fig. 3) having been found sufficient to remove the thread ends. Said fork is fixed upon a rod 171 secured to the separator slide 129 by means of the clamp shown in Fig. 20. Said clamp comprises a bracket 172 having a dovetail groove therein adapted to receive a dovetail extension 173 of said slide. The stripper-fork rod 171 is flattened at 174 to fit upon a seat 175 in the bracket 172, and said rod is clamped upon said seat by means of a clip 176 secured to the bracket 172 by means of a screw 177. In attaching the stripper fork rod 171 to the separator slide 129, the fork 170 is properly disposed in a precise vertical plane without attention from the operator by reason of the flattened portion 174 of said rod fitting upon its seat 175.

Figure 11:
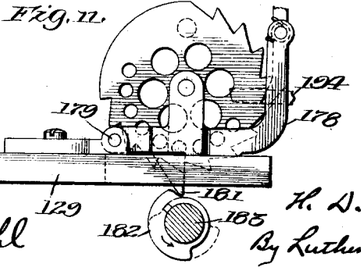
Fig. 11 is a detail view illustrating the counter mechanism, also showing the cam for moving the main slide rearwardly at each stumble movement of the selector mechanism.

The try-again mechanism for permitting a predetermined number of unsuccessful trials of the selectors 116 before the machine is stopped, is substantially the same as that shown and described in my prior application. In the present construction, however, the counter mechanism of said try-again device is carried upon a bracket 178 (Figs. 4 and 11) which bracket is pivotally connected at 179 with the slide that carries the thread-separating devices, said bracket being held in position upon said slide by means of a coiled spring 180. (Fig. 4.) A tooth 181 extends downwardly from the bracket 178 into position to be engaged by a cam 182 upon the shaft 183. The cam 182 is arranged to rotate in the direction indicated by the arrow in Fig. 11 for the purpose of moving the separator slide 129 rearwardly (toward the foot of the machine) to withdraw the thread-separating devices from the place where they are stopped by the stumblers 130 in order to permit the return of the selected thread to the plane of its warp. Should the cam 182 accidentally strike upon the end of the tooth 181, breakage is prevented by reason of the pivotal mounting of the bracket 178, said cam merely raising the bracket upon its pivot against the action of the coiled spring 180.

The main drive shaft 184 is rotatably supported in bearing posts 185 and 186 (Fig. 4) and has loosely mounted thereon a drive sheave 187 adapted to have a clutch connection with said shaft. A guide pin 188 slidably mounted in the bearing post 186 has rigidly fixed thereto a fork 189 adapted to enter an annular groove 190 in the hub of said drive sheave. A coiled spring 191 surrounding the guide pin 188 tends to slide said guide pin in the direction to break the clutch connection between the drive sheave 187 and the shaft 184. A clutch lever 192 pivotally mounted in the main carriage frame provides means for sliding said guide pin against the action of the spring 191, said lever having a stud 193 projecting from its side into an elongated opening (not shown) in the hub of the fork 189. A throw-out lever 194 (Figs. 2, 3, 4, 9 and 10) is pivotally mounted upon the standard 95 of the main carriage 51, the forward end of said lever lying in position to be engaged by the try-again device. The rear end of the guide pin 188 is in hook form to engage the throw-out lever 194. A coiled spring 195 tends to hold said throw-out lever in engagement with said guide pin. It will be seen that when the throw-out lever 194 is rocked by the try-again mechanism, it will be withdrawn from the hooked end of the guide pin 188, whereupon the spring 191 will disconnect the drive sheave 187 from the main drive shaft 184, stopping the machine. An arm 196 upon the throw-out lever 194 affords means for manually operating said lever. 197 is a crank upon the forward end of the main drive shaft 184 for manually rotating said shaft.

When the main carriage 51 has been fed along the bed 1 until the two warps have been united by the mechanism on said carriage, stumbling due to absence of warp threads causes the motor to be automatically disconnected from the main drive shaft 177 in the manner just explained. For returning the main carriage 51 to its starting point at the head end of the bed 1, I provide a winding shaft 198 (Figs. 1 and 8) extending lengthwise through said bed near the lower side thereof, and rotatably supported in suitable bearing openings in the bed and in an arm 199 extending from, and secured rigidly to, the head end of the bed.

The arm 199 at its outer end is formed as a cylindrical housing 200 which incloses a winding drum 201 fixed upon the winding shaft 198. Hand cranks 202 fixed upon the opposite ends of the winding shaft 198 permit of rotating the shaft and the winding drum from either end of the bed. An arm 203 also is fixed to the bed 1 at the head end thereof and carries at its outer end a guide sheave 204 for directing the winding cord 205 from its point of attachment to the main carriage 51 to the winding drum 201. The pivot pin 206 for said guide sheave projects from the side of the arm 203 to form a fixed trip pin for opening the bottom closure 91 of the waste collector 63. Thus when the main carriage 51 is drawn to the head end of the bed, the finger 94 strikes the trip pin 206, withdrawing the closure from the end of the collector and permitting the thread-ends that have accumulated in said collector to drop to the floor. The arm 203 also is provided with a socket 207 for receiving a spring-pressed plunger 208 adapted to cushion the return movement of the main carriage 51 at the head end of the bed.

Before the main carriage 51 can be drawn back to its starting position it is necessary to withdraw the feed pinions 98 and 99 from the racks 12 and 13. This is automatically accomplished by the following-described means: The rear ends of the levers 96 and 97 are connected by means of rods 209 (Figs. 9 and 10) with eccentrics of opposite "throw," said eccentrics being fixed upon the rear end of the eccentric shaft 210 rotatably supported upon the standard 211. On the forward end of said eccentric shaft is fixed a segmental gear 212 having on its face a rigid crank arm 213. A coiled spring 214 extends between the crank arm 213 and an eye 215 fixed to the base of the main carriage 51. The segmental gear 212 oscillates through about a half-rotation, stops 216 (Figs. 3, 9 and 10) upon its rear face striking upon a portion of the standard 211, and thus limiting the oscillatory movement of said gear. A segmental gear 217 meshing with the segmental gear 212 is fixed upon one end of a shaft 218 rotatably supported in the standard 211. On the opposite end of said shaft is fixed a sheave 219 around which the cord 205 is wrapped. To throw the pinions 98 and 99 into engagement with their racks 12 and 13 the crank arm 213 is moved by the operator to oscillate the eccentric shaft 210. Said pinions are automatically withdrawn from their racks when the winding shaft 198 is rotated to pull the main carriage 51 back to the head end of the machine, the pull-back cord 205, when unwinding from the sheave 219, oscillating the eccentric shaft 210 to withdraw said pinions. The spring 214 tends to hold said pinions either in or out of mesh with their racks, as the case may be. The segmental gear 217 carries upon its face a stud 220 adapted to engage the hooked rear end of the throw-out lever 194, said engagement being intended to prevent the operation of the pull-back mechanism when the warp tying mechanism is being operated by power. As will be seen from an inspection of Fig. 2, rotation of the segmental gear 212 is impossible until the throw-out lever 194 has been rocked to unclutch the main drive shaft 184 from the motor.

I would have it understood that the invention is not limited to the details herein shown and described, for various changes may be made without departing from the spirit of the invention.

The generic features of the machine disclosed in this application, among which are the sensitively-controlled feed, the means for clamping, stretching and deflecting the warps, the means for selecting, separating, severing, holding and tying the warp threads, the means for carrying away the waste thread-ends, the means for removing the united threads from the tying mechanism, and the try-again mechanism, are claimed broadly in my copending application Ser. No. 208,779, filed May 19, 1904. The sensitively-controlled feed, the means for clamping, stretching and deflecting a warp, and the means for selecting, separating, severing and holding warp threads, are disclosed in another embodiment shown in my copending application Serial No. 317,547, filed May 18, 1906, and are claimed generically in said last mentioned application.

I claim as my invention:

1. A textile machine comprising a pivotally mounted selector; means for reciprocating said selector; a stationary cam; and a member connected with said selector adapted to engage said cam.

2. A textile machine comprising a yoke; a selector pivotally mounted in said yoke; a spring tending to move said selector in one direction; a member engaging one end of said spring for adjusting the tension thereof; and a clamping blade and screw for locking said member in adjusted position.

3. A textile machine comprising a stripper member; a bracket having a seat thereon; a rod for carrying said stripper member, said rod being flattened at one side to fit upon said seat in position to hold said stripper member in proper alinement; and means for clamping said rod upon said seat.

4. A textile machine including a selector, means for moving said selector, a stationary member, and means coöperating with said selector to engage said stationary member to impart a swinging movement to said selector.

5. A textile machine including an oscillatory selector, means for imparting a longitudinal movement to said selector, a stationary member, and means on the selector to contact with the stationary member to impart an oscillatory movement to said selector.

6. In a mechanism for selecting threads from a warp, selecting means, a throw-out device adapted to be held from operation by a selected thread, a slide arranged to hold the throw-out device from operation, and a hand lever connected to said slide for operating the latter.

7. In a warp-uniting machine, a framework, a carriage supported by said framework, a warp-uniting mechanism on said carriage, a waste thread receptacle mounted on said carriage and operatively associated with said mechanism, said receptacle comprising a movable closure, means for traversing said carriage, and means on said framework engaging said closure to open the latter.

8. A textile machine comprising a fiber receiving receptacle, an air tube in communication with the receptacle, and means for securing said air tube in place, comprising a chamfered piece adapted to rest upon said air tube; a clamping block adapted to bear upon said chamfered piece; and a clamping screw for said clamping block.

9. In a textile machine, in combination, a reciprocatory selector; a separating device; and a stumbler adapted to engage said separating device, said stumbler being forked at its forward end, said selector reciprocating between the arms of the fork.

10. In a warp-tying machine, in combination, means for supporting two warps, a carriage; a warp-tying mechanism mounted on said carriage, said mechanism comprising a slidable thread-separating member; a shear blade pivotally mounted upon said carriage; a coöperating shear blade fixed to said slidable thread-separating member; and a guide member on said last mentioned shear blade adapted to engage said pivotally mounted shear blade.

11. In a thread clamp, in combination, a member adapted to be moved for operating said clamp; a pivoted lever having a socket therein; a socketed member attached to said movable member; and a link having cylindrical heads adapted to lie in the sockets of said lever and said socketed member.

12. In a thread clamp, in combination, a movable member adapted to operate said clamp; a member adjustably connected with said movable member; and an operating lever connected with said adjustably mounted member for moving said movable member.

13. In a thread clamp, in combination, a movable member adapted to operate the clamp, said member having a serrated portion; a serrated block adjustably fixed upon said serrated portion; and an operating lever connected with said block for moving said movable member.

14. In a textile machine, means for operating upon warp threads, a feed rack for receiving said means and having a pivoted portion, and a spring tending to hold said pivoted portion in line with the remainder of said feed rack.

15. In a textile machine, in combination, a framework, a warp clamp on said framework, means pivotally connected to said framework below said clamp and adapted to swing up into position adjacent said clamp, said means being adapted to releasably engage an insertion bar, and means for swinging said means to carry an insertion bar up to said clamp and insert it therein.

16. An insertion-bar remover mechanism comprising an oscillatory shaft and arms fixed on said shaft having means adapted to engage different portions of an insertion bar.

17. An insertion-bar remover mechanism comprising an oscillatory shaft; arms fixed to said shaft having openings therein adapted to receive an insertion bar; and means in said openings for frictionally engaging said insertion bar.

18. In a thread clamp, in combination, a fixed member; a bell-crank comprising a removable spring clamping finger; and means for moving said bell-crank.

19. In a thread clamp, in combination, a fixed clamping member; a movable member having two opposing ears thereon; and a spring clamping finger held between said ears and said fixed clamping member.

20. In a thread clamp, in combination, a fixed clamping member; a bell-crank comprising two opposing ears having pins thereon; and a spring clamping finger having openings therein adapted to receive said pins, said spring finger lying between said ears and said fixed clamping member.

21. In a textile machine, a carriage; a feed rack; a feed pinion on said carriage adapted to engage said rack; a cord for pulling back said carriage; and connections between said cord and said feed pinion adapted to cause a withdrawal of said feed pinion from said rack by the movement of said cord.

22. In a textile machine, a carriage; a feed rack; a feed pinion on said carriage; an operating mechanism on said carriage; driving means for said operating mechanism; a pull-back cord; connections between said feed pinion and said pull-back cord adapted to cause the withdrawal of said feed pinions from said feed rack by the movement of said cord; and means for preventing the withdrawal of said feed pinion while said operating mechanism and said driving means are operatively connected.

23. In a textile machine, in combination, a thread-separating mechanism; a projection connected with said mechanism to yield in one direction; and a cam adapted to engage said projection to restore said thread-separating mechanism.

24. In a textile machine, in combination, a thread-separating mechanism; a tooth pivotally connected with said mechanism; a spring tending to hold said tooth in operative position; and a cam adapted to engage said tooth to restore said thread-separating mechanism.

25. In a textile machine, in combination, a reciprocatory thread-engaging device; a fixed thread clamping member; and a clamping member slidably carried by said reciprocatory thread-engaging device.

26. In a textile machine, in combination, an exhaust air tube; a reciprocatory fork for carrying the threads into said air tube; a thread clamping member carried by said fork, but movable with relation thereto; and a thread clamping member adapted to coact with said first mentioned clamping member.

27. In a textile machine, in combination, an exhaust air tube; a reciprocatory fork for carrying the threads into said air tube; and a thread clamping member carried by said fork, but movable with relation thereto, for clamping said threads against the end of said exhaust air tube.

28. In a textile machine, in combination, a reciprocatory fork for advancing a thread; and a clamp for said thread comprising a clamping member mounted upon, but slidable with relation to, said fork.

29. In a textile machine, in combination, a reciprocatory member having a guide-way therein; a fork at the forward end of said member for engaging a thread; a thread clamp comprising a member slidably mounted in said guide-way; and means for frictionally holding said clamp member on said guide-way.

30. In a textile machine, in combination, a reciprocatory member forked at its forward end to engage a thread; a thread clamp comprising a clamping member slidably mounted on said reciprocatory member; an arm pivoted to said clamp member; and a spring for holding said arm against said reciprocate y member, said reciprocatory member having an inclined surface adapted to cause additional clamping pressure.

31. In a warp-uniting machine, in combination, warp-supporting means; an operating mechanism; means for causing relative traverse between the warp-supporting means and the operating mechanism comprising racks and pinions, said pinions being carried by pivoted levers; and means for withdrawing the pinions from the racks comprising a shaft having eccentrics thereon, links connecting said eccentrics with said levers, and means for rocking said shaft.

32. In a warp-handling machine, a machine bed; a carriage movably supported upon said bed; an operating mechanism mounted upon said carriage; a rack attached to said bed; a pinion supported upon said carriage for releasable engagement with said rack; means for rotating said pinion to feed said carriage toward the foot end of the bed; and means located at the head end of said bed and connected with said pinion for withdrawing the pinion from the rack and moving the carriage toward the head end of the bed.

33. In a warp-uniting machine, in combination, a bed; carriage guiding means and two warp clamps on said bed; a warp carriage having two warp clamps, said warp carriage being mounted above the bed; two feed bars, one on the bed and the other on the warp carriage; a carriage mounted on the guiding means; warp-uniting mechanism on the last mentioned carriage; an electric motor on the last mentioned carriage arranged to drive said mechanism; feeding devices driven by the motor and engaging said feed bars; a contact strip supported adjacent to and parallel with the path of movement of the mechanism carriage; and conducting means electrically connected to the motor for contacting said strip.

34. In a warp-uniting machine, in combination, a bed; carriage guiding means and two warp clamps on said bed; a warp carriage having two warp clamps, said warp carriage being mounted above said bed; two feed bars arranged at the same side of the machine, one being on the bed and the other on the warp carriage; a carriage mounted on the guiding means; warp-uniting mechanism on the last mentioned carriage; an electric motor on the last mentioned carriage arranged to drive said mechanism; feeding devices on the mechanism carriage driven by the motor and engaging said feed bars; a contact strip supported adjacent to and parallel with one of the feed bars; and conducting means electrically connected to the motor for contacting said strip.

35. In a warp-uniting machine, in combination, a bed; carriage guiding means and two warp clamps on said bed; a warp carriage having two warp clamps, said warp carriage being mounted above said bed; two parallel feed bars arranged at the same side of the machine, one being on the bed and the other on the warp carriage; a carriage mounted on the guiding means; warp-uniting mechanism on the last mentioned carriage; an electric motor on the last mentioned carriage arranged to drive said mechanism; feeding devices on the mechanism carriage driven by the motor and engaging said feed bars; a contact strip supported adjacent to and extending parallel with the feed bar on the bed; and conducting means electrically connected to the motor for contacting said strip.

36. In a warp-uniting machine, in combination, a bed; two warp clamps at opposite sides of and above the bed; a carriage supported above said clamps, comprising two warp clamps and upwardly arched connecting members; two feed bars, one on the bed and the other on the carriage, a warp-uniting mechanism arranged to travel along the bed between the clamps on the bed and between the clamps on the carriage, said mechanism being adapted to pass beneath said upwardly arched connecting members; feeding devices associated with said mechanism and engaging said feed bars for moving the mechanism along the bed; an electric motor associated with said mechanism to travel therewith, having a driving connection with said mechanism and said feeding devices; a contact strip supported adjacent to and parallel with the path of movement of the mechanism and motor; and conducting means electrically connected to the motor for contacting said strip.

37. In a warp-uniting machine, in combination, a bed; two warp clamps at opposite sides of and above the bed; a carriage supported above said clamps, comprising two warp clamps and upwardly arched connecting members; two feed bars, one on the bed and the other on the carriage, a warp uniting mechanism arranged to travel along the bed between the clamps on the bed and between the clamps on the carriage, said mechanism being adapted to pass beneath said upwardly arched connecting members; feeding devices associated with said mechanism and engaging said feed bars for moving the mechanism along the bed; an electric motor associated with said mechanism to travel therewith, having a driving connection with said mechanism and said feeding devices; conductor means supported adjacent to and parallel with the path of movement of the mechanism and motor; and conducting means electrically connected to the motor for contacting said conductor means.

38. In a warp-uniting machine, in combination, a bed; two warp clamps at opposite sides of and above the bed; a carriage supported above said clamps, comprising two warp clamps and upwardly arched connecting members; two feed bars arranged at the same side of the machine, one on the bed and the other on the carriage, a warp-uniting mechanism arranged to travel along the bed between the clamps on the bed and between the clamps on the carriage, said mechanism being adapted to pass beneath said upwardly arched connecting members; feeding devices associated with said mechanism and engaging said feed bars for moving the mechanism along the bed; an electric motor associated with said mechanism to travel therewith, having a driving connection with said mechanism and said feeding devices; two contact strips supported adjacent to and parallel with one of the feed bars; and conducting means electrically connected to the motor for contacting said strips.

HOWARD D. COLMAN.

Witnesses:
BURT A. PETERSON,
WM. D. HINTZE.